(No Model.)

F. B. VON PALSTRING.
TRICYCLE.

No. 301,307.

3 Sheets—Sheet 1.

Patented July 1, 1884.

Witnesses
Harold Serrell
Chris H Smith

Inventor
Franz Baron von Palstring
per Lemuel W. Serrell
Atty (No Model.)

F. B. VON PALSTRING.
TRICYCLE.

No. 301,307.  3 Sheets—Sheet 3.

Patented July 1, 1884.

Witnesses
Harold Serrell
Chas N Smith

Inventor
Franz Baron von Palstring
per
Lemuel W. Serrell
Atty

UNITED STATES PATENT OFFICE.

FRANZ BARON VON PALSTRING, OF KOLITZ, NEAR COSWIG, SAXONY, GERMANY.

TRICYCLE.

SPECIFICATION forming part of Letters Patent No. 301,307, dated July 1, 1884.

Application filed May 19, 1884. (No model.)

*To all whom it may concern:*

Be it known that I, FRANZ BARON VON PALSTRING, of Kolitz, near Coswig, Kingdom of Saxony, German Empire, have invented a new and useful Improvement in Tricycles; and the following is declared to be a description of the same.

Velocipedes, bicycles, and tricycles are propelled over the ground by both a rotary motion imparted by the feet to cranks and by an up-and-down or treading motion imparted by the feet to levers and strap-connections to the wheels. Said machines, especially tricycles, have been propelled by the combined action of the weight of the body and hand operating-levers.

My invention relates to a tricycle wherein the propelling-power is given by the combined weight of the body and an up-and-down step-by-step walking action of the feet, acting upon swinging pivoted frames having straps or bands passing over clutch-pulleys and connected to the toothed and chain wheels and chains which operate the two main wheels of the vehicle. I also provide a novel steering apparatus consisting of pivoted arms having rests for the shoulders of the cyclist, and which are operated by a swaying movement of the body from side to side, according to the direction to be traveled, there being cords from the ends of the pivoted arms to a cross-rod upon the head of the rear steering-wheel. I also provide brake-levers and bands around pulleys upon the main axle, and controlling-levers to lock the brake and to make a backward movement of the machine possible. An umbrella may be placed upon the upright frame of the machine, to protect the cyclist from sun or rain, and when turned down is capable of use as a sail, to assist in propelling the machine upon a level road.

Figure 1:
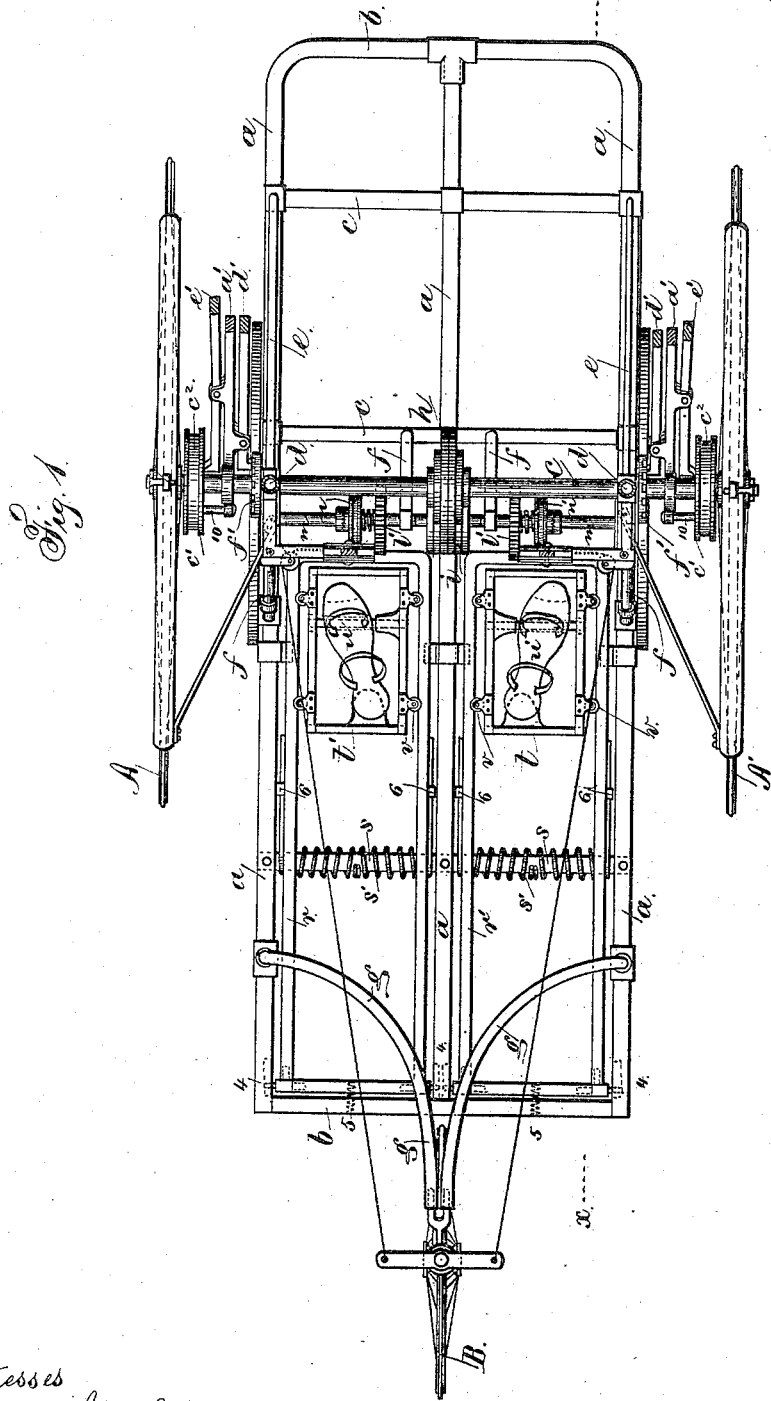
Figure 2:
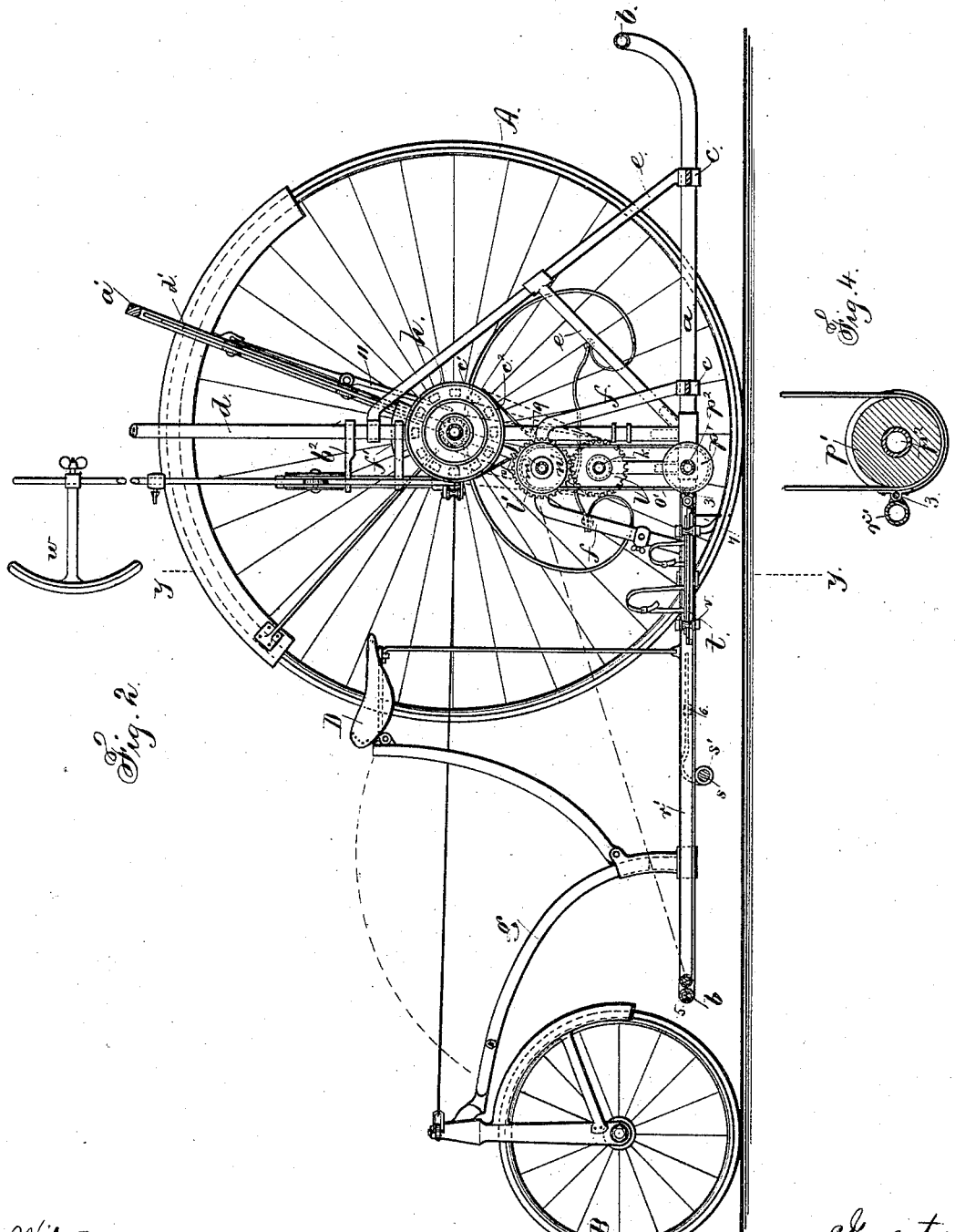
Figure 3:
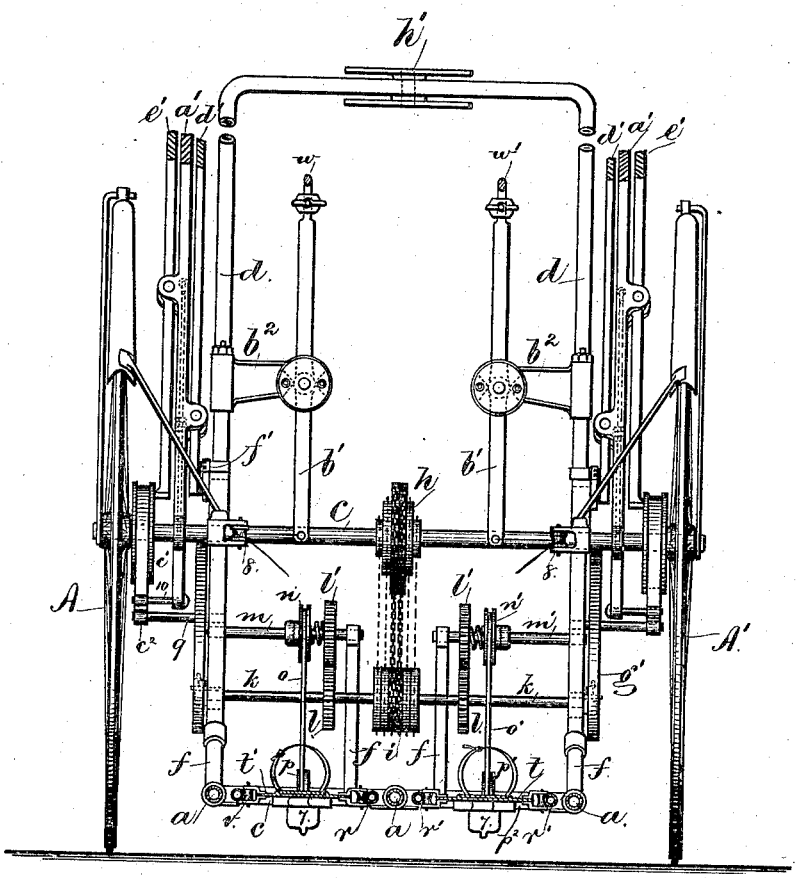
Figure 5:
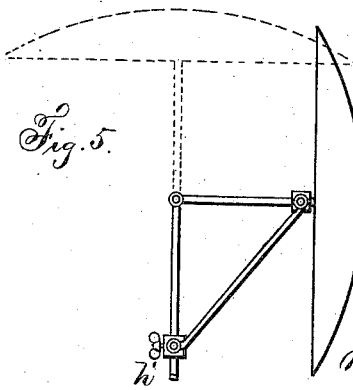

In the drawings, Figure 1 is a plan of the machine. Fig. 2 is a side elevation of the machine sectionally at $x\ x$ of Fig. 1, and Fig. 3 is a rear view and partial cross-section of the machine at $y\ y$ of Fig. 2. Fig. 4 is a view of the strap-connections, and Fig. 5 is a view of the swinging umbrella.

A A' are the main driving-wheels, and B the rear steering-wheel.

The framing of the machine is, as usual, of steel tubing, connected in the usual manner, and consists of the longitudinal tubes $a$, end tubes, $b$, cross-frame $c$, upright tubes $d$, bracing-tubes $e$, shaft-supporting tubes $f$, and the V-shaped tubular frame $g$ for the rear steering-wheel. I prefer to employ segmental guards to the wheels A, A', and B, as shown in the drawings.

Upon the main axle C there are chain-wheels $h$ of various sizes for speed and power, and these are provided with endless chains passing around the respective chain-wheels $i$ upon the shaft $k$. Upon said shaft $k$ are the toothed wheels $l$, meshing with the toothed wheels $l'$ upon the shafts $m\ m'$. Upon said shafts $m\ m'$ are the strap-wheels and clutches $n\ n'$, and the straps $o\ o'$ pass around these wheels and around wheels $p\ p'$ upon the shaft $p^2$, and said straps are connected to the tubular frames $r\ r'$ at 3 in any desired manner—for instance, as shown in Fig. 4. The tubular frames $r\ r'$ are pivoted to the tubes $a$ at 4, their pivots working in slots in the tubes $a$, (see dotted lines, Fig. 1,) at this point the said frames $r\ r'$ being capable of a forward movement in said slots as they are raised by springs S S', so that the ends of said frames may keep their relative position to the straps $o\ o'$, such motion being given by the spiral springs 5. There is a cross-tube, $s$, under and secured to the tubes $a$, and around said tube the springs $s'$ are coiled and secured at their inner ends, their long ends passing through lugs 6 upon the side pieces of the tubular frames $r\ r$. Said springs $s'$ lift the tubular frames $r\ r'$ into the position indicated in Fig. 2 by dotted lines.

Inside the tubular frames $r\ r'$ there are sliding frames $t\ t'$, supporting pivoted foot-pieces $u\ u'$, pivoted near their forward ends to said frames $t\ t'$, and there are rollers $v$ in bearings upon the sides of frames $t\ t'$, whose outward-curved circumferences fit the side tubes composing the frames $r\ r'$. These frames $t\ t'$ are free to be slid forward and backward, and the foot-pieces upon them have straps for the feet, and projecting pieces or blocks 7 upon the under side of the toe portion.

The machine is propelled in the following manner, the cyclist either sitting on the saddle D, with his feet upon $u$ $u'$, or else standing on the foot-pieces $u$ $u'$, with the arm-rests $w$ $w'$ under the arms, and the hands grasping handles upon the rods $a'$ $a'$: To start the machine the pivoted foot-pieces $u$ $u'$ are tipped forward, bringing the projection 7 in contact with the ground, and the frames $t$ $t'$ pushed backward. The feet are then lifted and depressed either alternately or together. As the right foot is lifted the frame $t$ is moved forward, the tubular frame $r'$ is lifted by the spring $s'$ and given a slight forward movement by the spring 5, the strap $o'$ is raised, and the wheels $n'$ $p'$ given a partial revolution, the clutch-teeth slipping over each other so as to disengage. As pressure is applied by the right foot, the clutch catches, the wheels $n'$ $l'$ are revolved, and in turn cause toothed wheel $l$ and chain-wheels $i$ $h$ and their chains to revolve and turn the shaft C and driving-wheels A A' and propel the machine. The tubular frame $t$ moves backward in frame $r$ as the foot is pressed down and drawn back. The movements of the left foot and the mechanism it operates are identical with those of the right foot.

The machine is guided by the wheel B, which is swung by cords connected to a cross-bar upon the head of the wheel-forks, said cords passing around pulleys 8, and being connected to lever-arms $b'$, pivoted to the brackets $b^2$ upon the side tubes of the machine. The arm-rests $w$ $w'$ are connected to the levers $b'$, and the cyclist, by moving his body from side to side as occasion requires, operates the arms $b'$, and through the cords turns the wheel B, guiding the machine.

The brake mechanism is composed of the drums $c'$ upon the axle C, the straps $c^2$ passing around said drums, the ends of which are fastened to the rods 9 and 10. The rods 9 are secured to the frame of the machine, the rods 10 to the lower end of the levers $a'$. A movement upon the upper ends of levers $a'$ tightens the straps $c^2$ upon the drums and brakes up the speed of the machine. The lever-arms $a'$ are pivoted to the axle $c$, and hence when they are moved so as to tighten the straps such straps apply friction to the wheels $c'$ and check or stop the movement of the machine.

Upon the levers $a'$ the lock-levers $d'$ $e'$ are pivoted at opposite sides. At the lower ends of the levers $d'$ are studs that are adapted to pass into holes in the stationary sectors $f$ upon the frame $d$, so that the brake-levers can be locked and held by these levers $d'$ in any positions to which they may be moved whether the brakes are in action or out of action. At the outer sides of the brake-levers $a'$ there are stop-levers $e'$, pivoted upon the brake-levers, and having studs adapted to enter holes in the sides of the brake-wheels $c'$. These levers $e'$ can be used to lock the machine, so that the wheels cannot be turned if the levers $d'$ and $e'$ are both locked; but if only the levers $e'$ are locked with the wheel $c'$ the levers $a'$ $d'$ $e'$ can all be swung upon the axle C to give the wheels a slight movement in either direction to start the machine. A bow-spring, $g'$, may be employed between the main axle C and the frame of the machine, to lessen vibration and cause the machine to ride easily.

A small lever, 11, attached to the edge of the brake-arm $a'$, and acting against a ratchet-wheel on the axle C, serves the purpose of preventing the machine running backward when ascending a grade, because when this is released at the top its lower end engages the teeth of this wheel. The hub of the lever $a'$ around the axle C may be hollow, so as to receive the ratchet-wheel.

An umbrella or parasol can be attached upon the upper part of the frame of the machine at $h'$, and this can serve to protect the cyclist from sun or rain, or it can be turned down horizontal when the wind is favorable and used as a sail to assist propulsion, as seen in Fig. 5.

The seat and frame supporting it may be thrown back upon the V-shaped frames $g$ out of the way when not required.

I claim as my invention—

1. In a tricycle, the combination, with the driving-wheels, their chain-wheels, and chains, of the shaft $k$, toothed wheels $l$ $l'$, shafts $m$ $m'$, straps, wheels, and clutches $n$ $n'$, straps $o$ $o'$, strap-wheels $p$ $p'$, and mechanism, substantially as described, for operating these parts, as and for the purposes set forth.

2. The combination, in a tricycle, with the frame $a$ $b$ $c$, slotted at 4, of the tubular frames $r$ $r'$, and springs 5, the springs $s'$, the sliding frames $t$ $t'$, and rollers $v$, and the foot-pieces $u$ $u'$, the connection at 3 between the frames $r$ $r'$, and straps $o$ $o'$, and mechanism, substantially as described, for operating the main driving-wheels, as and for the purposes set forth.

3. The combination, with the frames $a$ $b$ $c$, of the tubular frames $r$ $r'$, the sliding frames $t$ $t'$, the pivoted foot-pieces $u$ $u'$, straps for the feet upon said foot-pieces, and blocks 7 upon the under side of the toe portions, as and for the purposes set forth.

4. In a tricycle, the combination, with the rear steering-wheel, a cross-bar upon its head, and guiding-cords, of the pivoted arms $b'$ and arm-rests $w$ $w'$, as and for the purposes set forth.

5. In a tricycle, the combination, with the driving-wheels A A and axle C, the drum $c'$, strap $c^2$, and rods 9 10, of the brake-rods $a'$, arms $d'$ $e'$, toothed sectors $f'$, and lever 11, the parts being constructed and operating substantially in the manner and for the purposes set forth.

In testimony whereof I have hereunto set my hand, this 9th day of November, 1883, in the presence of two subscribing witnesses.

FRANZ BARON VON PALSTRING.

Witnesses:
  WILHELM WIESENHÜTTER,
  GEORG RICHTER.